(12) United States Patent
Horrer

(10) Patent No.: US 6,647,107 B1
(45) Date of Patent: Nov. 11, 2003

(54) MULTI-USER ANSWERING SYSTEM AND METHOD

(75) Inventor: Matthias M. Horrer, Raleigh, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/321,516

(22) Filed: May 27, 1999

(51) Int. Cl.⁷ .............................................. H04M 3/42
(52) U.S. Cl. ............................ 379/214.01; 379/265.11
(58) Field of Search ..................... 379/265.11, 266.04, 379/142.01, 142.06, 214.01

(56) References Cited

U.S. PATENT DOCUMENTS

| | | | |
|---|---|---|---|
| 4,048,452 A | 9/1977 | Oehring et al. | |
| 4,289,934 A | 9/1981 | Pitroda et al. | |
| 4,788,715 A | 11/1988 | Lee .............................. | 379/84 |
| 4,873,717 A | * 10/1989 | Davidson et al. ...... | 379/142.01 |
| 5,027,384 A | * 6/1991 | Morganstein .......... | 379/207.05 |
| 5,299,259 A | 3/1994 | Otto ........................... | 379/221 |
| 5,327,486 A | * 7/1994 | Wolff et al. .................. | 379/96 |
| 5,329,578 A | * 7/1994 | Brennan et al. .............. | 379/67 |
| 5,384,841 A | 1/1995 | Adams et al. .............. | 379/266 |
| 5,673,299 A | 9/1997 | Fuller et al. ................... | 379/57 |
| 5,703,943 A | 12/1997 | Otto ............................ | 379/265 |
| 5,841,854 A | 11/1998 | Schumacher et al. ....... | 379/265 |

FOREIGN PATENT DOCUMENTS

| | | | |
|---|---|---|---|
| EP | 0 876 067 A1 | 11/1998 | ............ H04Q/3/00 |
| WO | WO 98/53591 | 11/1998 | ............ H04M/3/42 |

* cited by examiner

*Primary Examiner*—Ahmad F. Matar
*Assistant Examiner*—Rasha S Al-Aubaidi
(74) *Attorney, Agent, or Firm*—Michael Blaine Brooks, P.C.; Michael Blaine Brooks; David A. Cordeiro

(57) ABSTRACT

A system and method for receiving calls for a plurality of persons. The system receives an incoming telephone call at a communications host, such as a PBX, from a caller for called person and queries a database for a set of information regarding the called person. The database can include information for each individual supported by present invention. The system can then query the status of the called person's phone line and announce to the caller some information regarding the called person. The system then forwards the incoming telephone call, the status of the called person's phone line, and the set of information regarding the called person to a display screen of a human secretary, who then answers the incoming telephone call.

11 Claims, 3 Drawing Sheets

MULTI-USER ANSWERING SYSTEM AND METHOD

TECHNICAL FIELD OF THE INVENTION

The present invention relates generally to telecommunications systems and methods, and more particularly, a system and method that incorporates computer software to all multiple individuals to share a human secretary without the caller being aware that the secretary is being shared.

BACKGROUND OF THE INVENTION

Today's businesses are relying more and more on telecommunications systems to help manage their interaction with others. Customer service and the access to key employees often determine how a company is perceived. Businesses want to reduce their customer service costs by enabling their employees to maintain a maximum number of calls and reduce their idle time to a minimum. Conventional or prior art methods typically employ ACD (automatic call distribution) services or voice mail in conjunction with automated attendants.

Conventional ACD systems are designed to handle large volumes of calls and provide a necessary service to large businesses. ACD systems route incoming telephone calls to a pool of agents or to a specific agent based on the telephone number dialed by the customer, information entered by the customer, or the customer's phone number. In certain instances when all agents are busy, ACD systems can hold the call in a queue, prompt the caller to leave a voice message for a later call back, or redirect the call to another group of agents with a shorter queue time. Data on the number of calls and the length of wait can also be monitored in ACD networks to determine proper loading of agents.

Automated telephone answering systems have been employed by many small to mid-sized companies to off-load work from live operators to the callers. The caller enters information using touch tones or the caller's voice. The computer analyzes customer input information and completes certain commands. For instance, an automated attendant may be programmed to answer a call, "Thank You for calling company XYZ. If you know your party's extension please enter it now." Once the extension has been entered the call will be connected to the party's line or voice mail.

For small businesses and companies with departments remotely located, the need for a full-time secretary to answer incoming phone calls may not be needed or may not be affordable. Employing an ACD system or an automated attendant may not be the best solution for these smaller businesses. First, ACD systems are designed to handle large volumes of calls for large businesses and consequently are expensive. Also, some conventional ACD systems and automated attendants have automated menus that are often an annoyance to customers and callers. Customers and callers may often find it difficult connecting with a live operator. Any negative feeling on the caller's behalf can have detrimental effects on how the company is perceived.

In addition to the impersonal nature of automated attendants and ACD systems, these systems do not access dynamic information regarding the called person and the caller. If the called person is unavailable, voice mail is activated. Information regarding the availability of the called person or an alternate means of contact is not available. Such information may be very helpful to the caller in the event called person is not available. In turn, disseminating information regarding the caller to called person may aid the called person with the needs of the caller.

Therefore, a need exists for an affordable telecommunication system designed specifically for small businesses. Such a system should maintain the personal feel of a human secretary while reducing the amount of idle time experienced by the human secretary. The system should also have access to information regarding the caller and the called person. This information should enable the: secretary and the called person to be of more assistance to the caller. Ultimately, such a system should preserve the personal feel of a live secretary, yet should be informative and cost-effective.

SUMMARY OF THE INVENTION

The present invention provides a telecommunications system and method for processing incoming telephone calls to a group of individuals at small businesses or remotely located sites that substantially eliminates or reduces disadvantages and problems associated with previously developed ACD systems and methods used for processing and distributing incoming telephone calls.

Specifically, the present invention is a system and method for receiving calls for a plurality of persons. The system receives an incoming telephone call at a communications host, such as a PBX, from a caller for a called person and queries a database for a set of information regarding the called person. The database can include information for each individual supported by present invention. The system can then query the status of the called person's phone line and announce to the caller some information regarding the called person. The system then forwards the incoming telephone call, the status of the called person's phone line, and the set of information regarding the called person to a display screen of a human secretary, who then answers the incoming telephone call.

The present invention provides an important technical advantage by enabling a small company to maximize personnel efforts by minimizing idle time. A small business, a group of small businesses, or a group of remotely located persons may share the cost of the human secretary.

Another important technical advantage is the present invention introduces the human secretary as the first line of interaction with the caller. Should the human secretary's line be busy, the caller has the option to hold for the secretary or be directly connected to the called person's line. Further, the present invention presents the human secretary as the personal secretary to the called person. Utilizing the present invention, the small business provides the appearance of more dedicated service to the caller.

Still another important technical advantage is the present invention provides the human secretary with information from a called-person database. This database provides information about the called person to the human secretary's display screen. The human secretary then uses the information regarding the called person when communicating with the caller.

The option of including a caller database in the present invention provides yet another technical advantage. The caller database provides information to the human secretary at the human secretary's display screen. The human secretary then disseminates the information regarding the caller to the called person verbally or through the called person's display screen.

Another technical advantage of the present invention is that the telephone number of the called person is not only forwarded to the human secretary, but it is also used by the system to establish a connection towards the called person.

Since the human secretary has to deal with a plurality of called persons, it can be expected that the human secretary may confuse the numbers of the called persons. Therefore, a simple means, like a one-button transfer, helps to prevent a connection to the wrong called person. For instance, pressing a specific button would always connect to the correct called person.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGS., like numerals being used to refer to like and corresponding parts of the various drawings.

The present invention provides a system and method for receiving telephone calls for a plurality of persons that can be remotely located or located within the same building. The system is implemented in such a manner that the caller is not necessarily made aware that the human secretary is shared between companies or employees.

Figure 1:
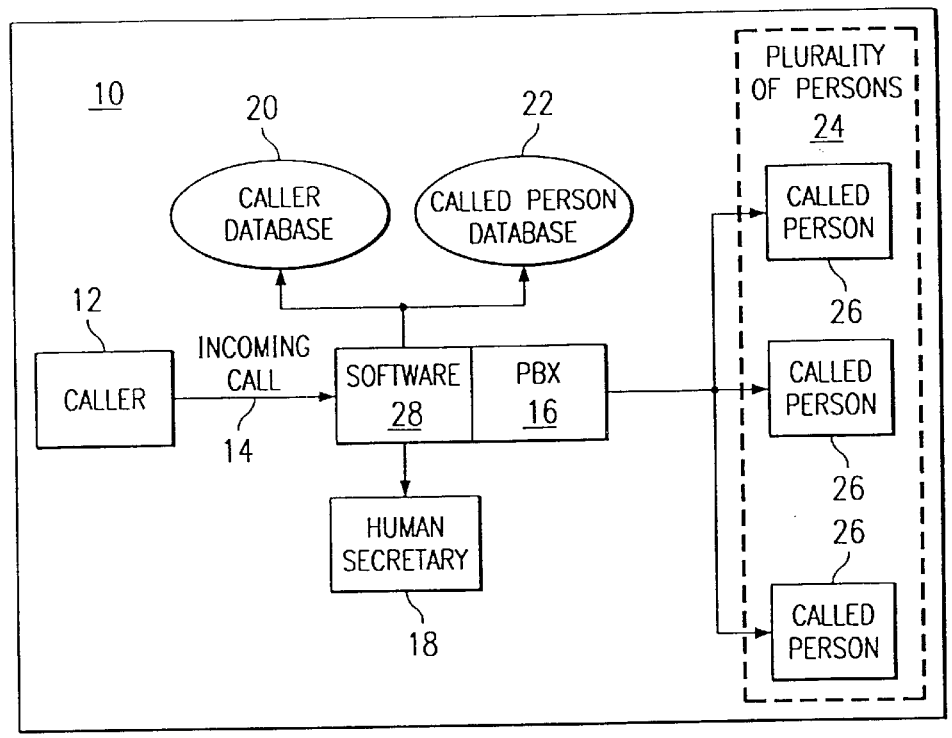
FIG. 1 is a step diagram illustrating the main features of the an embodiment of the present invention.

FIG. 1 is a step diagram including the main components of the present invention 10. An incoming telephone call 14 is received at a communications host, such as PBX 16, from a caller 12. The PBX 16 contains the Generic Secretary software program 28 stored on a memory device. The PBX 16 may also include a processor to execute the Generic Secretary software program 28. The Generic Secretary Software program 28 controls the process of the present invention. A called-person database 22 is accessed by the Generic Secretary software program 28 on the PBX 16 to determine if the called person 26 uses the human secretary 18. The called-person database 22 is a database that can store information regarding the called person 26 such as the called person's employer and address or the called person's work schedule. The called-person database 22 may be stored in memory on the PBX 16 or stored in memory on a peripheral device accessible by the PBX 16. The called person 26 is among a group of individuals using the human secretary 24. The human secretary 18 receives information from the called-person database 22 through the Generic Secretary software program 28 on the PBX 16. The human secretary 18 can optionally receive information from a caller database 20 through the Generic Secretary software program 28 on the PBX. The caller database 20 may store information regarding the caller 12 such as the caller's company and position. The caller database 20 may be stored in memory at the PBX 16 or stored in memory on a peripheral device accessible by the PBX 16.

Figure 2:
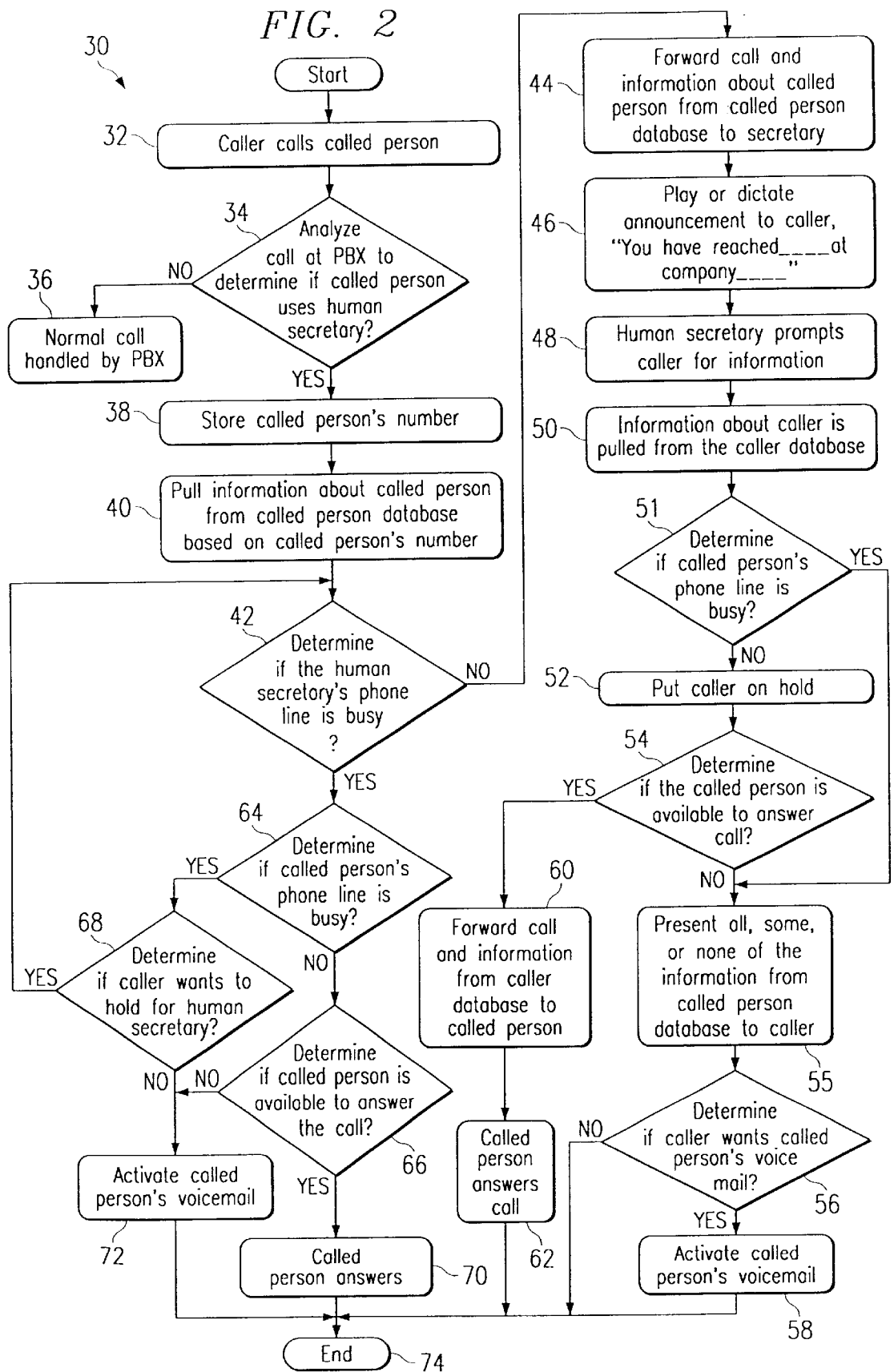
FIG. 2 is a flow diagram for the embodiment of FIG. 1.

FIG. 2 represents a flow diagram 30 illustrating the overall process for one embodiment of the present invention. At step 32, the caller 12 calls the called person 26. At step 34, the incoming telephone call 14 is analyzed at a communications host, such as PBX 16, by the Generic Secretary software program 28 which accesses a called-person database 22 to determine if the called person 26 is a member of a group of individuals 24 using the human secretary 18. If the called person 26 does not use the human secretary 18, the incoming telephone call 14 is processed solely by the PBX 16 at step 36. If the called person 26 does use the human secretary 18, the called person's number can be stored at step 38. Based on the called person's phone number, the Generic Secretary software program 28 may access additional information about the called person 26 stored on the called-person database 22 at step 40. At step 40, the status of the called person's phone line can also be verified by the Generic Secretary software program 28 to determine if the called person's phone line is busy. At step 42, the status of the human secretary's line can optionally be verified prior to forwarding the incoming telephone call 14 at step 44. If the human secretary's line is busy, the status of the called person's line can be verified at step 64. If the called person's line is busy, the caller 12 may be queried at step 68 to either hold for the human secretary 18 or be forwarded to the called person's voicemail. If the caller 12 chooses to hold for the human secretary 18, the status of the secretary's line can be repeatedly checked at step 42 until the human secretary's line is no longer busy. If the caller 12 decides not to hold for the human secretary 18, the called person's voicemail can be activated at step 72 and the call may end at step 74. If it is determined at step 64 that the called person's phone line is not busy, the incoming telephone call 14 can be forwarded to the called person 26. It can be determined at step 66 if the called person 26 is available to answer the incoming telephone call 14. If the called person 26 is not available to answer the incoming telephone call 14, the called person's voicemail can be activated at step 72 and the incoming telephone call 14 may end at step 74. If the called person 26 is available to answer the incoming telephone call 14, the called person 26 may answer the incoming telephone call 14 and then the incoming telephone call 14 may end at step 74.

After the information regarding the called person 26 has been extracted from the called-person database 22, the incoming telephone call 14, the status of the called person's phone line, and the information from the called-person database 22 can be forwarded to the human secretary 18 at step 44. At step 46, an announcement can be played or dictated by the human secretary 18 to the caller such as, "You have reached at Company." At step 48, the human secretary 18 may answer the incoming telephone call 14 and may prompt the caller 12 for information. At step 50, any available information about the caller 12 from the caller database 20 may be pulled by the Generic Secretary software program 28 and presented to the human secretary 18. The human secretary 18. may see information on the human secretary's display screen regarding the company of both the caller 12 and the called person 26. Information on the screen may also include a schedule for the called person 26. The Generic Secretary software program 28 may provide the human secretary 18 with a one-button transfer to connect the caller 12 with the called person 26 or to connect the human secretary 18 to the called person 26. The one-button transfer allows the human secretary 18 to serve multiple called persons 26 without confusing multiple telephone numbers. If the called person's line is busy, the caller 12 may be placed on hold by the human secretary 18 at step 52. At step 54, it can be determined whether the called person 26 is available to answer the incoming telephone call 14. If the called person 26 is not available to answer the incoming telephone call 14, the human secretary 18 may prompt the caller 12 to determine if the caller 12 wants the called person's voicemail at step 56. If the caller 12 does want the called person's voicemail, it may be activated at step 58 and the incoming telephone call 14 may end at step 74. If the caller 12 does not want the called person's voicemail, the incoming telephone call 14 may end at step 74. At step 54, if the called person 26 is available to answer the incoming telephone call 14, any information regarding the caller 14 may be forwarded to the called person 26 at step 60. This information may be forwarded by the human secretary 18 to the called person 26 by phone or to the called person's display screen. At step 62, the called person 26 may answer the incoming telephone call 14 and the incoming telephone call 14 may end at step 74.

In the event that the called person's line is busy at step 51, the caller 12 may be presented with at least a portion of the information about the called person 26 from the called-person database 22 by the human secretary 18 at step 55. At step 56, the human secretary 18 may prompt the caller to determine if the caller 12 wants the called person's voicemail. If the caller 12 does not want the called person's voicemail the incoming telephone call 14 may end at 74. If the caller 12 does want the called person's voicemail, the called person's voicemail may be activated at 58 and then the call may end at 74.

An additional embodiment of the present invention 10 would allow the incoming telephone call 14 to be forwarded to a number other than the number of the called person 26. Therefore in step 55 of FIG. 2, if the called person 26 was not available to receive the incoming telephone call 14, but a forwarding number was presented in the information from the called-person database 22, the human secretary 18 may relay the forwarding number to the caller 12 or forward the incoming telephone call 14 to the forwarding number directly.

Figure 3:
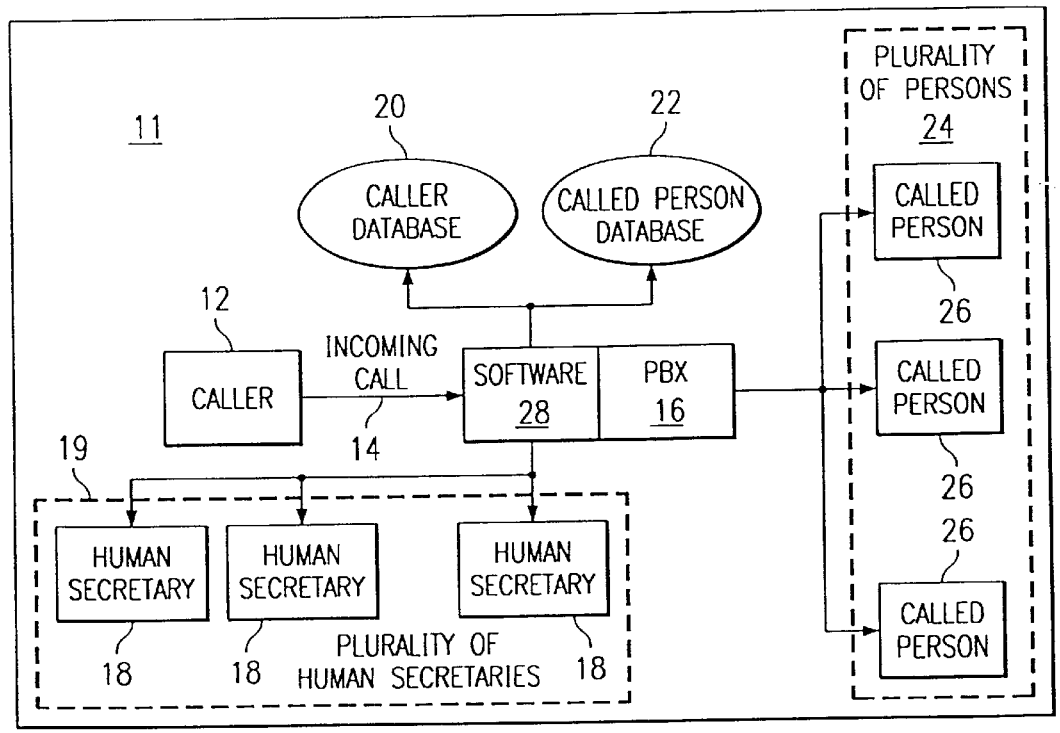
FIG. 3 is a block diagram illustrating the main features of a second embodiment of the present invention.

FIG. 3 presents another embodiment 11 of the present invention. The items of FIG. 3 are identical to those in FIG. 1 with the exception that the human secretary 18 in FIG. 1 is replaced by a plurality of human secretaries 19 in FIG. 3.

Figure 4:
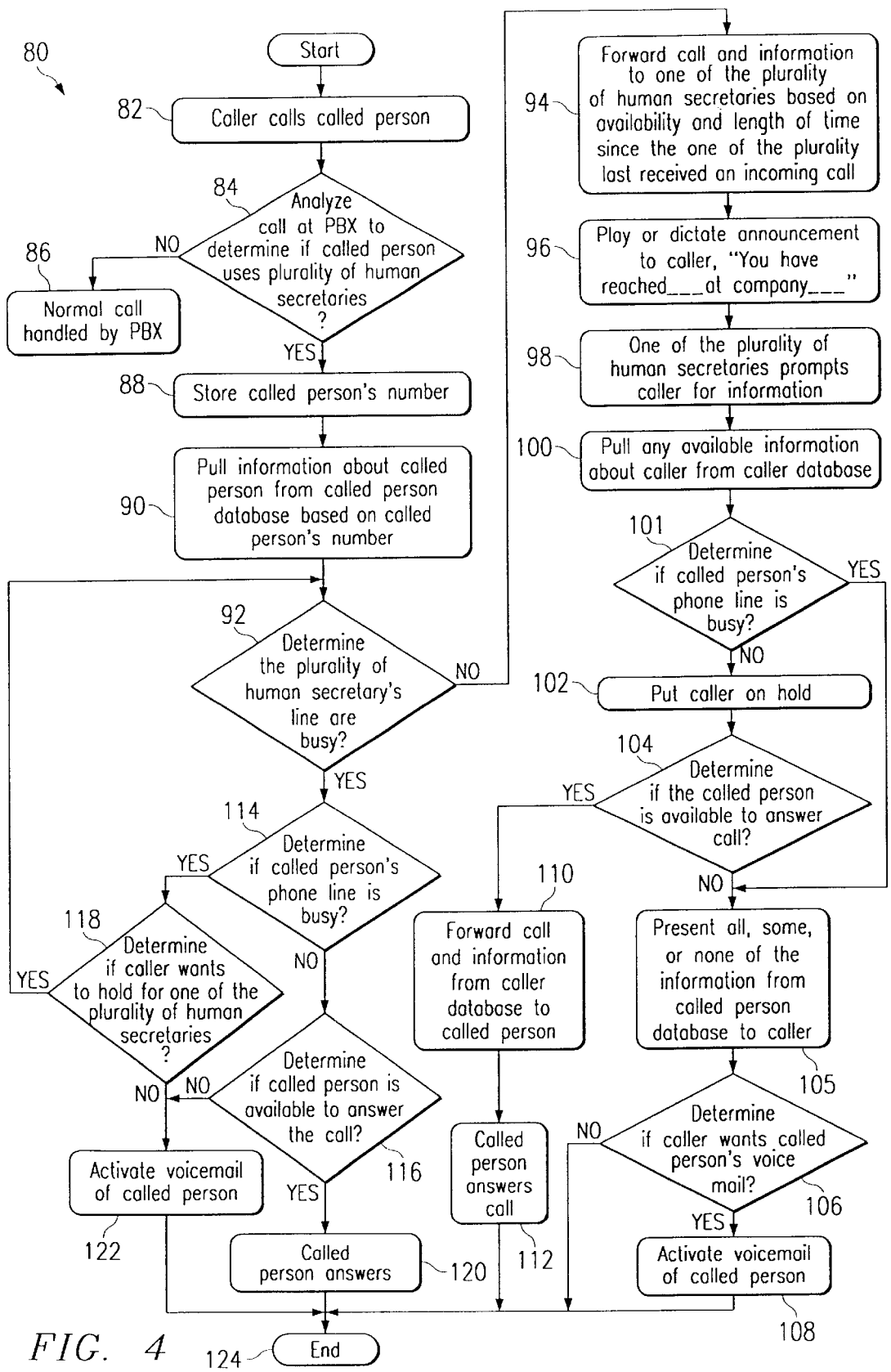
FIG. 4 is a flow diagram for the second embodiment of FIG. 3.

A more detailed description of the embodiment 11 shown in FIG. 3 is illustrated in FIG. 4. FIG. 4 represents the flow diagram 80 for the overall process of the embodiment 11. At step 82, the caller 12 calls the called person 26. At step 84, the incoming telephone call 14 is analyzed at a communications host, such as PBX 16, by the Generic Secretary software program 28 which accesses a called-person database 22 to determine if the called person 26 is a member of the group of individuals 24 using a group of human secretaries 19. If the called person 26 does not use the group of human secretaries 19, the incoming telephone call 14 is processed solely by the PBX 16 at step 86. If the called person 26 does use the group of human secretaries 19, the called person's number can be stored at step 88. Based on the called person's phone number, the Generic Secretary software program 28 accesses information about the called person 26 stored on the called-person database 22 at step 90. At step 90, the status of the called person's phone line can also be verified by the Generic Secretary software program 28. At step 92, the status of each phone line of the plurality of human secretaries can be verified by the Generic Secretary software program 28. If all of the human secretaries' phone lines are busy, the status of the called person's line can be verified at step 114. If the called person's line is busy, the caller 12 is queried at step 118 to either hold for one of the plurality of human secretaries 18 or be forwarded to the called person's voicemail. If the caller 12 chooses to hold for one in the, group of human secretaries 18, the status of the group of human secretaries' phone lines is repeatedly checked at step 92 until at least one in the plurality of human secretaries' phone lines is no longer busy. If the caller 12 decides not to hold for one in the group of human secretaries 18, the called person's voicemail may be activated at step 122 and the incoming telephone call 14 may end at step 124. If it is determined at step 114 that the called person's phone line is not busy, the incoming telephone call 14 can be forwarded to the called person 26. It may be determined at step 116 if the called person 26 is available to answer the incoming telephone call 14. If the called person 26 is not available to answer the incoming telephone call 14, the called person's voicemail can be activated at step 122 and the incoming telephone call 14 may end at step 124. If the called person 26 is available to answer the incoming telephone call 14, the called person 26 may answer the incoming telephone call 14 at step 120 and then the incoming telephone call 14 may end at step 124.

If, when verifying the status of the group of human secretaries' phone lines, it is determined that at least one phone line of the group of human secretaries is not busy, the incoming telephone call 14, the status of the called person's phone line, and the information from the called-person database 22 may be forwarded to one of the group of human secretaries 18 at step 94. The incoming telephone call 14, the status of the called person's phone line, and the information from the called-person database 22 may be forwarded to one in the group of human secretaries 18 based on availability or the length of time since that one in the group of human secretaries 18 received an incoming telephone call. At step 96, an announcement can be played or dictated by the human secretary 18 to the caller such as, "You have reached at Company." At step 98, the human secretary 18 may answer the incoming telephone call 14 and prompt the caller 12 for information. At step 100, any available information about the caller 12 may be pulled from the caller database 20 by the Generic Secretary software program 28 and presented to the human secretary 18. The human secretary 18 may see information on the human secretary's display screen regarding the company of both the caller 12 and the called person 26. Information on the screen may also include a schedule for the called person 26. If the called person's line is busy at step 101, the caller 12 may be placed on hold by the human secretary 18 at step 102. The Generic Secretary software program 28 may provide the human secretary 18 with a one-button transfer to connect the caller 12 with the called person 26 or to connect the human secretary 18 to the called person 26. The one-button transfer allows the human secretary 18 to serve multiple called persons 26 without confusing multiple telephone numbers. At step 104, it may be determined whether the called person 26 is available to answer the incoming telephone call 14. If the called person 26 is not available to answer the incoming telephone call 14, the human secretary 18 may prompt the caller 12 to determine if the caller 12 wants the called person's voicemail at step 106. If the caller 12 does want the called person's voicemail, the called person's voicemail may be activated at step 108 and the incoming telephone call 14 may end at step 124. At step 104, if the called person 26 is available to answer the incoming telephone call 14, any information regarding the caller 12 may be forwarded to the called person at step 110. This information may be forwarded by the human secretary 18 to the called person 26 by phone or to the called person's display screen. At step 112, the called person 26 may answer the incoming telephone call 14 and the incoming telephone call 14 may end at step 124.

In the event that the called person's line is busy at step 101, the caller 12 may be presented with at least a portion of the information about the called person 26 from the called-person database 22 by the one of the plurality of human secretaries 18 at step 105. At step 106, the human secretary 18 may prompt the caller to determine if the caller 12 wants the called person's voicemail. If the caller 12 does not want the called person's voicemail, the incoming telephone call may end at 124. If the caller 12 does want the called person's voicemail, the called person's voicemail may be activated at 108 and then the call may end at 124.

An additional embodiment of the embodiment 11 would allow the incoming telephone call 14 to be forwarded to a number other than the number of the called person 26. Therefore in step 105 of FIG. 4, if the called person 26 was not available to receive the incoming telephone call 14, but a forwarding number was presented in the information from the called-person database 22, the human secretary 18 could relay the forwarding number to the caller 12 or forward the incoming telephone call 14 to the forwarding number directly.

An important benefit of the present invention 10 is that the human secretary 18 is presented as the first line of interaction with the caller 12. Should the human secretary's line be busy, the caller 12 has the option to hold for the human secretary 18 or be directly connected to the called person's phone line or voice mail.

Still another important benefit of the present invention is that the present invention provides the human secretary 18 with information from a calledperson database 22. This database provides information about the called person 26 to the human secretary's display screen. The human secretary 18 can then disseminate the information regarding the called person 26 to the caller 12. Additionally, the present invention has the option of a caller database 20. This database may provide the human secretary 18 with valuable information about the caller 12 to forward to the called person 26.

The present invention presents the human secretary 18 as the personal secretary to the called person 26. Utilizing the present invention a group of called persons 24 such as a small business or a group of remotely located persons can provide the appearance of more dedicated service to the caller 14.

The present invention also has the option of having a group of human secretaries 19 servicing a group of individuals 14. This reduces or eliminates any hold time the caller 12 may experience.

Although the present invention has been described in detail, it should be understood that various changes, substitutions and alterations can be made hereto without departing from the spirit and scope of the invention as described by the appended claims.

What is claimed is:

1. A method for receiving calls for a plurality of persons comprising:
   receiving an incoming telephone call from a caller for a called person at a communications host;
   querying a database for a set of information regarding the called person based on the number of the called person;
   querying for a status of the called person's phone line;
   forwarding the incoming telephone call, the status of the called person's phone line, and the set of information regarding the called person to a display screen of a human other than the called person;
   answering the incoming telephone call by the human;
   announcing to the caller at least a portion of the set of information regarding the called person; and
   implementing a one-button transfer of the incoming call to the called person, wherein implementing is performed by the human.

2. The method of claim 1, further comprising analyzing the incoming telephone call at the communications host to determine if the called person uses the human.

3. The method of claim 1, further comprising determining if the called person's phone line is busy.

4. The method of claim 1, wherein announcing to the caller at least a portion of the set of information regarding the called person further comprises playing an announcement message to the caller or displaying the announcement to the human and having the human read the announcement to the caller.

5. The method of claim 1, wherein answering the incoming telephone call by the human further comprises;
   talking to the caller;
   entering information about the caller; and
   pulling any available caller information from a caller database.

6. The method of claim 1, further comprising processing the incoming telephone call by the human comprising:
   presenting at least a portion of any available caller information from the caller database on the called person's terminal;
   forwarding the incoming telephone call to the called person; and
   forwarding the incoming telephone call to person's voice mail or forwarding the incoming telephone call to another number or disconnecting the incoming telephone call.

7. The method of claim 1, wherein, if the human's phone line is busy, processing the incoming telephone call by the communications host comprising:
   holding the incoming telephone call for the human; or
   forwarding the incoming telephone call to the called person's phone line or voice mail.

8. The method of claim 1, wherein
   forwarding comprises forwarding the incoming telephone call to a one of a plurality of humans based on an availability of the one of the plurality of humans or a length of time since the one of the plurality of humans last received a forwarded call.

9. The method of claim 8, wherein answering comprises answering the incoming telephone call by the plurality of humans comprising:
   talking to the caller;
   entering information about the caller; and
   pulling any available caller information from a caller database.

10. The method of claim 9, further comprising processing the incoming telephone call by the one of the plurality of humans comprising:
    presenting at least a portion of the any available caller information from the caller database to the called person;
    forwarding the incoming telephone call to the called person; and
    forwarding the incoming telephone call to person's voice mail or forwarding the incoming telephone call to another number or disconnecting the incoming telephone call.

11. The method of claim 8, wherein, if all phone lines of the plurality of humans are busy, processing the incoming telephone call by the communications host, further comprising:

holding the incoming telephone call for the one of the plurality of humans;

forwarding the incoming telephone call to the called person; or forwarding the incoming telephone call to the called person's voice mail.

* * * * *